United States Patent [19]

Gomez-Alecha

[11] 4,049,173

[45] Sept. 20, 1977

[54] BAR STOCK FEEDING DEVICE

[75] Inventor: Laurentino Gomez-Alecha, Mondragon, Spain

[73] Assignee: Alacoop S. Coop., Mondragon, Spain

[21] Appl. No.: 683,374

[22] Filed: May 5, 1976

[30] Foreign Application Priority Data

June 17, 1975 Spain .................................. 213217

[51] Int. Cl.² ............................................ B65H 23/04
[52] U.S. Cl. .................................... 226/196; 82/38 A
[58] Field of Search ....................... 226/196, 198, 199; 82/38 A, 38

[56] References Cited

U.S. PATENT DOCUMENTS

| 962,829 | 6/1910 | Girard | 82/38 A |
|---|---|---|---|
| 2,187,405 | 1/1940 | Smethers | 226/187 UX |
| 2,619,712 | 12/1952 | Bechler | 226/196 X |
| 3,541,904 | 11/1970 | Gurtner | 82/38 A |

FOREIGN PATENT DOCUMENTS

| 744,511 | 1/1944 | Germany | 226/199 |
|---|---|---|---|
| 763,620 | 12/1956 | United Kingdom | 226/196 |

*Primary Examiner*—Richard A. Schacher
*Attorney, Agent, or Firm*—Robert E. Ross

[57] ABSTRACT

A bar stock feeding assembly and a vibration damping support block for use therein. An elongated housing is provided with a plurality of internal blocks to support a bar stock being fed to a machine tool. Each support block is provided with a central opening slidably receiving the bar stock, and a plurality of legs extending outwardly into engagement with the internal wall of the housing to position the block in relation to the housing. At least the legs of the block are formed of resilient material such as rubber or plastic so that vibration of the bar stock, while being acted on by the machine tool, is not transmitted to the housing.

5 Claims, 8 Drawing Figures

BAR STOCK FEEDING DEVICE

BACKGROUND OF THE INVENTION

Devices used for feeding round stock into machine tools such as lathes, boring-machines and others, have a number of different parts whose purpose it is to guide the stock in the direction required, and among these there is firstly the elongated housing through which it is fed, together with the member used for pushing it forward, and secondly there is the part guiding the member which feeds the stock forward. Both these parts are generally joined together along the whole length of the feeding device.

The chief disadvantage with these feeding devices is the noise and vibrations which take place inside the sleeve due to the contact and rubbing between it and the stock. An additional disadvantage comes about as the result of forces being transmitted to the sleeve by the stock rubbing against it when being fed forwards, such forces being hard to avoid so long as this part of the feeding device comprises a continuous tube for guiding the stock. This situation inevitably gives rise to some malfunction in the operation of the feeding device, with the resulting decrease in productivity of the machine.

SUMMARY OF THE INVENTION

In order to alleviate the difficulties described above, the present invention comprises a superior arrangement for the feeding device, entailing a number of improvements made to the housing through which the stock is fed forward so that the feeding device is rendered substantially silent in operation, and in addition, substantially no forces or vibrations are transmitted to it.

For this purpose, the inside of the elongated housing for feeding the round stock to the machine is fitted with a plurality of vibration-damping blocks, which can either be joined to one another directly, or alternatively they can be linked together by means of tubes. Regardless of whichever arrangement of the two is used, the blocks each have a central opening which are aligned in the housing to make up the channel or duct through which the bar stock slides. In one embodiment of the invention the blocks are also provided with an enclosed duct for the bar stock feeding member to travel through.

If the blocks are not made to include the duct as described, then they may be provided with flanges forming the edges of the slot which engage between other flanges on the housing so that the slot is held open, thus allowing the member which feeds the stock forward to travel freely along it.

In this way a continuous guide for the bar stock is provided, composed of a series of separate vibration isolating units.

The blocks as described are supported against the inside of the sleeve or housing by means of legs extending outwardly therefrom, and which provide a high degree of vibration-damping due to the resilience or anti-vibrationary nature of the material from which the blocks themselves are made (i.e. rubber or plastic). The ends of the legs may simply rest against the inside corners of the housing, or their ends may be fitted into suitable grooves provided for this purpose on the inside of the housing.

DESCRIPTION OF THE ILLUSTRATED EMBODIMENTS

In accordance with the present invention, a housing for feeding bar stock into a machine tool is provided with at least two channels of which one 1 is intended for guiding the stock, while the other is intended for guiding the travel mechanism 8 carrying the member which feeds the stock 4 forward. This latter member travels inside the same duct or channel as does the round stock (see FIG. 2). Travel feed mechanism 8 can be operated either by suspended weights, or by means of a piston in a cylinder. (Not shown)

Figures 1, 2:
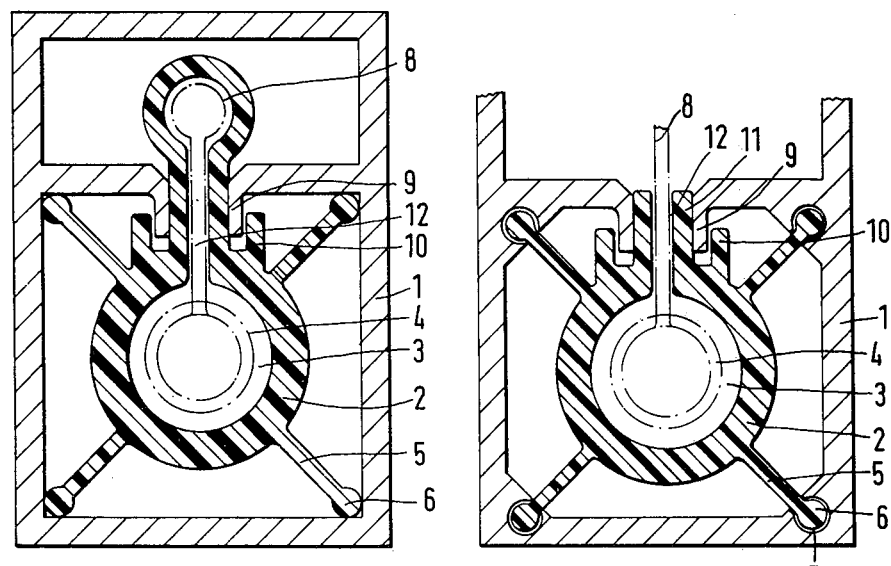
FIG. 1 is a view in transverse section of one form of bar stock feed assembly embodying the invention.
FIG. 2 is a view in transverse section of another form of bar stock feed assembly embodying the invention.
Figure 5:
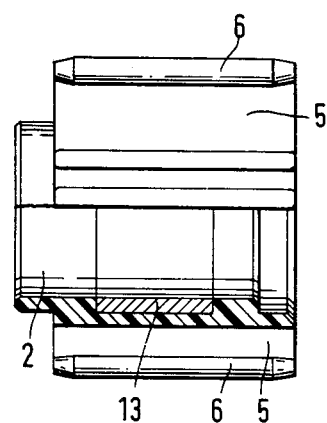
FIG. 5 is a top plan view of a support block embodying the invention.
Figure 6:
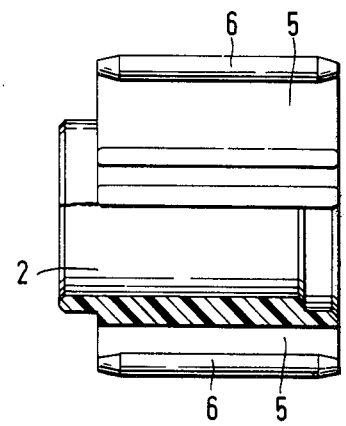
FIG. 6 is a top plan view of another form of support block embodying the invention.
Figure 7:
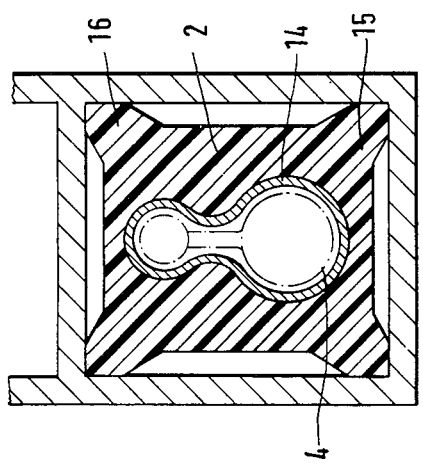
FIG. 7 is a view in transverse section of another form of bar stock feed assembly, taken on line VII—VII of FIG. 8.

For guiding the bar stock along the inside of the feeding device. 1, this latter is fitted with a series of blocks 2 along it length inside, and whose shape may be as depicted in FIGS. 1, 2 or 7. These blocks 2 are joined to one another in such a way that they make up the actual duct 3 along which the bar stock is made to travel. Duct 3 acts also as a guide for member 4 which feeds the stock forward. An important feature of the blocks 2, which can be seen in a side view in FIGS. 5 and 6, is that they are of an anti-vibrationary nature, being made of rubber, plastic, etc., and in one embodiment, they may be fitted with an inside reinforcing ring 13.

Figure 3:
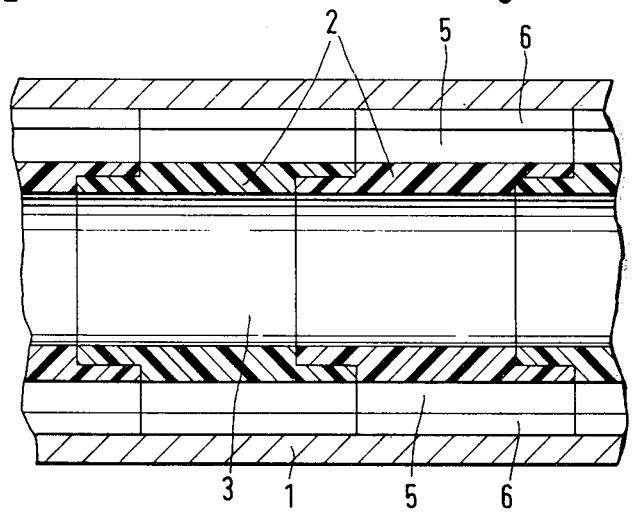
FIG. 3 is a view in horizontal section of the embodiment of FIG. 1.
Figure 4:
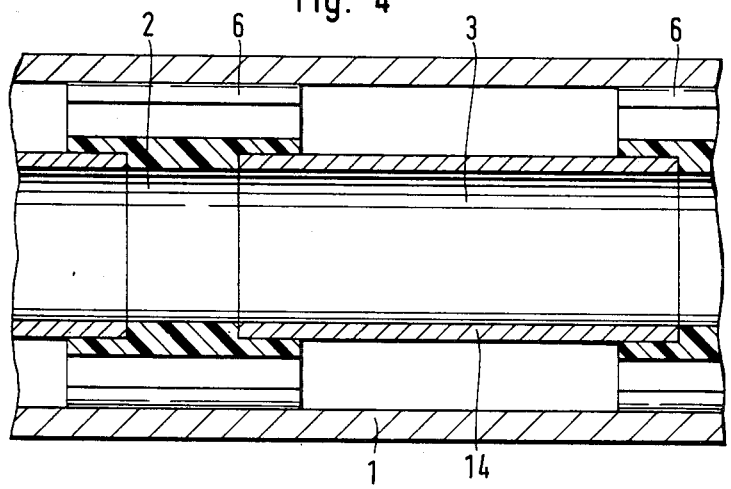
FIG. 4 is a view in horizontal section of another embodiment of the invention.
Figure 8:
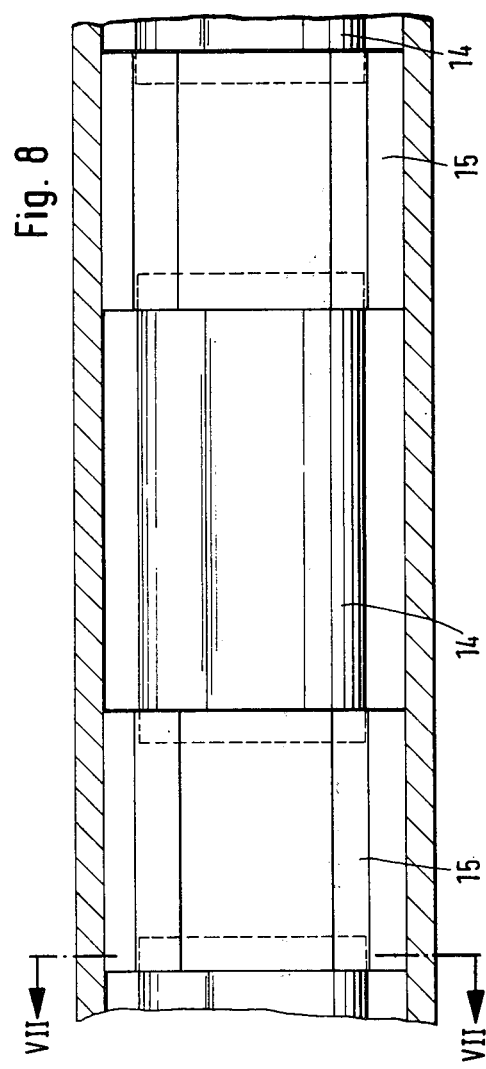
FIG. 8 is a top plan view, partly in section, of the assembly of FIG. 7.

Blocks 2 can either be directly linked to one another (see FIG. 3) or they can be indirectly linked by means of tubular sections 3 for connecting them to one another (see FIGS. 4 and 8). Tubular sections 3 have the same internal shape as the inside of blocks 2, (see FIGS. 7 and 8), and are employed when heavy large diameter stock is being fed through the device.

Blocks 2 rest on the inside of housing or sleeve 1 through radial fins arranged like clubbed feet 5, or, as in FIG. 7 by the provision side protrusions 15, forming part of the actual body 2. Ends of feet 5 are clubbed 6 to afford firm support, or alternatively they may engage inside grooves 7 arranged along the inside of sleeve or duct 1, and because of their elasticity, feet 5 absorb mechanical shocks and vibrations arising when round stock is being fed into the machine.

A further feature embodied in blocks 2 is that a side opening or groove 12 is arranged along their side so as to allow room for linkage between member 4 whose purpose is to feed the stock forwards, and its driving mechanism 8. Slot 12 in blocks 2 is arranged to lie in line with a slot in tubular linking sections 14 so as to allow passage of the linkage between feeding member 4 and its travel mechanism 8.

Two lips or edges 11 protrude from block (2) and flank opening (12), (see FIG. 1) in such a way that they form an enclosure which protrudes from block 2 towards the channel or duct along which travel mechanism (8) slides.

Lips 9 are positioned outside of lips 11 which are enclosed by other lips 10 protruding from block 2, so that opening 12 is prevented from closing, thus enabling travel mechanism 8 to work freely without hinderance.

Since certain changes apparent to one skilled in the art can be made in the illustrated embodiments of the invention without departing from the scope thereof, it is intended that all matter contained herein be interpreted in an illustrative and not a limiting sense.

I claim:

1. An assembly for feeding bar stock into a machine tool, comprising an elongated feeder housing of non-circular internal cross-section and a plurality of blocks disposed in said housing, said blocks each having a central aperture to slidably receive the bar stock, and a series of outwardly extending portions comprised of vibration damping material positioned and dimensioned for engaging the interior of the feeder housing to prevent vibration of the bar stock from being transmitted to the housing and to render the block non-rotatable in the housing.

2. An assembly as set out in claim 1 in which each of said blocks has a slot opening from the exterior to the central opening said slots being aligned to allow a stock feeding mechanism to travel therethrough.

3. A vibration absorbing block for assembly into an elongated feeder housing of non-circular internal cross-section for bar stock, said block having a central opening for slidably receiving the bar stock, and a plurality of resilient legs extending from the block to engage the interior surface of the feeder housing to non-rotatably position block in relation to the housing and to prevent vibration of the bar stock from being transmitted to the housing.

4. A block as set out in claim 3 in which said block has 4 legs extending therefrom in directions so as to seat in 4 corners of a rectangular housing.

5. A block as set forth in claim 3 which has a slot opening to the central opening and axially aligned therewith to allow a stock feeding mechanism to travel therethrough.

* * * * *